United States Patent
Sutardja

(10) Patent No.: US 7,701,660 B1
(45) Date of Patent: Apr. 20, 2010

(54) SHOCK CANCELLATION SYSTEM

(75) Inventor: Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 495 days.

(21) Appl. No.: 11/704,747

(22) Filed: Feb. 9, 2007

Related U.S. Application Data

(60) Provisional application No. 60/783,942, filed on Mar. 20, 2006.

(51) Int. Cl.
*G11B 5/596* (2006.01)
(52) U.S. Cl. .............. 360/77.02; 360/78.04; 360/78.09
(58) Field of Classification Search .............. None
See application file for complete search history.

(56) References Cited

U.S. PATENT DOCUMENTS

| | | | |
|---|---|---|---|
| 5,299,075 A * | 3/1994 | Hanks | 360/77.02 |
| 6,538,839 B1 * | 3/2003 | Ryan | 360/77.02 |
| 6,580,579 B1 * | 6/2003 | Hsin et al. | 360/77.02 |
| 6,914,743 B1 * | 7/2005 | Narayana et al. | 360/77.08 |
| 2002/0009031 A1 * | 1/2002 | Rumpf et al. | 369/53.18 |
| 2007/0183076 A1 * | 8/2007 | Baugh et al. | 360/75 |

* cited by examiner

*Primary Examiner*—Jason C Olson

(57) ABSTRACT

A control system includes a difference generating module for a rotating storage system that generates a position error signal based on a target position signal and a current position signal. A control module of the control system generates an output response based on the position error signal. A noise equalizer module of the control system generates a noise equalization signal that is based on a sensor signal, the output response and the position error signal. A compensation module of the control system adjusts at least one of the current position signal, the position error signal, and the output response based on the noise equalization signal.

36 Claims, 10 Drawing Sheets

SHOCK CANCELLATION SYSTEM

CROSS-REFERENCE TO RELATED APPLICATIONS

This application claims the benefit of U.S. Provisional Application No. 60/783,942, filed on Mar. 20, 2006. The disclosure of the above application is incorporated herein by reference in its entirety.

FIELD

The present disclosure relates to control systems, and more particularly to control systems for data storage devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, an exemplary control system 10 includes an input signal X (i.e. a target response of the control system 10), an output response signal Y, and an error signal E. A control module 12 controls the output response signal Y based on the error signal E. The error signal E is a difference between the input signal X and the output response signal Y. In other words, the control module 12 attempts to control the output response signal Y to "follow" the input signal X. The control system 10 can be described as:

$Y=E*H$; and $E=X-Y$, where H represents a transfer function of the control system 10. Each of the values X, Y, and E is a vector that includes values that occur over time.

Referring now to FIG. 2, a control system 14 typically includes a disturbance N, such as noise. For example, the disturbance N may be introduced into the control system 14 due to performance, manufacturing, and/or environment imperfections. The disturbance signal N is added to the output response signal Y to model the effects of the disturbance N on the control system 14. The result is a final observable response signal Z. The control system 14 can be described as:

$Y=E*H$;

$Z=Y+N$; and $E=X-Z$.

In other words, due to the presence of the disturbance signal N, the output response signal Y is not observable.

The disturbance signal N may include a random component (for example, random noise), a shock component, and/or a repeatable component (for example, a recurring disturbance due to a constant system imperfection). Typically, effects of a random disturbance signal N are non-correctable. For example, mitigating the effects of a random disturbance signal N may be limited to selecting a different transfer function H and/or changing other parameters of the control system.

Referring now to FIG. 3, a magnetic hard disk drive (HDD) may include a hard disk assembly (HDA) 15 that includes a voice-coil motor (VCM) 16 and head gimble assembly (HGA) 17. The VCM/HGA 16, 17 is supported by a hinge (not shown) that allows the VCM/HGA 16, 17 to swing. The rotational swing of the VCM/HGA 16, 17 controls the position of a read/write head 18. Rotational shock experienced by the HDD may adversely impact the VCM/HGA 16,17.

The VCM/HGA 16, 17 includes one or more hard drive platters 19 that include magnetic coatings that store servo and user data as magnetic fields. The platters 19 are rotated by a spindle motor that is schematically shown at 20.

Referring now to FIG. 4, positioning a read/write head over a disk medium is accomplished by having the VCM/HGA 16, 17 lock to a predetermined servo wedge. A servo wedge 21 may include several data fields, including a preamble field 22, a servo sync-mark (SSM) 24 field, a track/sector identification (ID) field 26, a plurality of position error signal (PES) fields 28, 29, and repeatable run-out (RRO) fields 30, 31.

The preamble field 22 may be used to synchronize the servo information stored in the servo track/sector ID field 26. The SSM 24 may be used to mark the ending point of the preamble field 22 and the starting point of the track/sector ID 26. The SSM 24 may also be used as a reference point for the position of other data payloads throughout servo fields. The track/sector ID field 26 indicates both the circumferential position and the coarse radial position of the read/write head 18. The track/sector ID field 26 typically includes a servo track number, which identifies the current track the read/write head 18 is located over while the read/write head 18 is seeking to a selected track.

The position information contained in a servo field is used to determine the fine position of the read/write head 18 on the platter surface and to provide a VCM control module (not shown) an instantaneous position error signal (PES). The PES 28, 29 provide information concerning fine radial positioning of the head. Typically, a PES is the difference between the measured position computed from the servo pattern and the desired position of the read/write head 18. RRO is a repeatable component in the disturbance signal N that may be caused by imperfections in the HDD and/or the platter 19. RRO may cause errors in position detection and control of the read/write head 18.

SUMMARY

A control system comprises a difference generating module for a rotating storage system that generates a position error signal based on a target position signal and a current position signal. A control module of the control system generates an output response based on the position error signal. A noise equalizer module of the control system generates a noise equalization signal that is based on a sensor signal, the output response and the position error signal. A compensation module of the control system adjusts at least one of the current position signal, the position error signal, and the output response based on the noise equalization signal.

In other features, the compensation module comprises a summing module. A plant module of the control system generates the current position signal. A shock sensor of the control system senses shock experienced by the rotating storage system and generates the sensor signal. The shock sensor senses at least one of rotational shock and lateral shock experienced by the rotating storage system. The noise equalizer module comprises an equalizer module and an equalizer coefficient module. A transfer function of the equalizer module is determined using a least means square function of at least one of the sensor signal and the position error signal.

In other features, the equalizer module comprises one of a finite impulse response filter or an infinite impulse response filter. The equalizer coefficient module generates a coefficient, and the equalizer module uses the coefficient to generate the noise equalization signal. The plant module comprises a transfer function of at least one of a voice coil motor (VCM) driver, a VCM assembly, and a position demodulator. The control module compensates for repeatable run-out (RRO) in the position error signal. The equalizer is calibrated during manufacturing by applying shock to the rotating storage system through controlled shock events. The rotating storage system is shocked by controlled shock events on a vibration platform.

In other features, a storage device comprises the control system and further comprises one of an optical storage device or a magnetic storage device. A hard disk drive (HDD) comprises the control system and further comprises a spindle control module that implements the control system. A hard disk drive (HDD) comprises the control system and further comprises a voice coil motor (VCM) control module that implements the control system. A hard disk drive (HDD) comprises the control system. The equalizer is calibrated during manufacturing by subjecting a section of the HDD to controlled shock events. The section of the HDD is subjected to the controlled shock events on a vibration platform.

In other features, a control system compensates for shock events in a voice coil motor (VCM) control system of a rotating storage device. The control system comprises a VCM control loop that includes a VCM plant module and a noise cancellation input. A shock sensor generates a shock signal. An equalizer of the control system equalizes the shock signal to a matched signal that compensates for an equivalent shock input to the VCM plant module and outputs the matched signal to the noise cancellation input. The shock sensor comprises a rotational shock sensor.

In other features, equalizing is based on a least means square analysis of at least one of the shock sensor signal and the position error signal. The equalizer module comprises a finite impulse response filter. A hard disk drive (HDD) comprises the control system. The equalizer module is calibrated during manufacturing by subjecting a hard disk assembly (HDA) of the HDD to controlled shock events.

In other features, a method for controlling a rotating storage system comprises generating a position error signal based on a target position signal and generating a current position signal. The method further comprises generating an output response based on the position error signal. The method further comprises generating a noise equalization signal based on a sensor signal, the output response and the position error signal. The method further comprises adjusting at least one of the current position signal, the position error signal, and the output response based on the noise equalization signal.

In other features, the method comprises generating a current position signal. The method further comprises sensing shock experienced by the rotating storage system and generating a sensor signal based on the shock. Sensing shock further comprises sensing at least one of rotational shock and lateral shock experienced by the rotating storage system.

In other features, the method comprises generating a transfer function of an equalizer module that generates the noise equalization signal. The transfer function is based on a least means square function of at least one of the sensor signal and the position error signal. The method further comprises generating a coefficient and using the coefficient to generate the noise equalization signal.

In other features, the method comprises compensating for repeatable run-out (RRO) in the position error signal. The method further comprises calibrating the equalizer module during manufacturing of the rotating storage system by applying shock to at least a section of the rotating storage system through controlled shock events. The rotating storage system is subjected to the controlled shock events on a vibration platform. The method further comprises fixing settings for the equalizer module based on the calibration of the equalizer module.

In other features, a method for compensating for shock events in a voice coil motor (VCM) control system of a rotating storage device comprises generating a shock signal. The method further comprises equalizing the shock signal with a matched signal that compensates for an equivalent shock input to a VCM plant module of a VCM control loop. The method further comprises outputting the matched signal to a noise cancellation input of the VCM control loop.

In other features, the shock signal comprises a rotational shock signal. Equalizing further comprises analyzing at least one of the shock signal and the position error signal with a least means square function. The method further comprises calibrating an equalizer module that equalizes the shock signal. The equalizer is calibrated during manufacturing of the rotating storage device by applying shock to the rotating storage device through controlled shock events.

In other features, a method for calibrating a voice coil motor (VCM) control loop of a hard disk drive (HDD) comprises applying shock to a hard disk assembly (HDA) of the HDD through controlled shock events during a manufacturing process. The method further comprises calibrating an equalizer module based on said controlled shock events. The equalizer module is adapted to equalize a shock signal of a sensor to compensate for an equivalent shock input to a VCM plant module of a VCM control loop. The method further comprises fixing settings for the equalizer module based on the calibration of the equalizer module.

In other features, a control system for a rotating storage comprises difference generating means for generating a position error signal based on a target position signal and a current position signal. The control system also comprises control means for generating an output response based on the position error signal. The control system also comprises noise equalizer means for generating a noise equalization signal that is based on a sensor signal, the output response and the position error signal. The control system also comprises compensation means for adjusting at least one of the current position signal, the position error signal, and the output response based on the noise equalization signal.

In other features, the compensation means comprises summing means for summing. The control system further comprises plant means for generating the current position signal. The control system further comprises shock sensor means for sensing shock experienced by the rotating storage system that generates the sensor signal. The shock sensor means senses at least one of rotational shock and lateral shock experienced by the rotating storage system. The noise equalizer means comprises equalizer means for equalizing and equalizer coefficient means for generating a coefficient.

In other features, a transfer function of the equalizer means is determined using a least means square function of at least one of the sensor signal and the position error signal. The equalizer means comprises one of filter means for generating a finite impulse response or filter means for generating an infinite impulse response. The equalizer coefficient means generates a coefficient. The equalizer means uses the coefficient to generate the noise equalization signal. The plant means comprises a transfer function of at least one of a voice coil motor (VCM) driver, a VCM assembly, and a position demodulator. The control means compensates for repeatable run-out (RRO) in the position error signal.

In other features, a storage device comprises the control system and further comprises one of an optical storage device or a magnetic storage device. A storage device comprises the control system and further comprises spindle control means for controlling a spindle that implements the control system. A storage device comprises voice coil motor (VCM) control means for controlling that implements the control system. The equalizer means is calibrated during manufacturing by subjecting the HDD to controlled shock events. The HDD is subjected to the controlled shock events on a vibration platform.

In other features, a control system compensates for shock events in a voice coil motor (VCM) control system of a rotating storage device. The control system comprises a VCM control loop that includes VCM plant means for controlling and a noise cancellation input. The control system also comprises shock sensor means for generating a shock signal. The control system also comprises equalizer means for equalizing the shock signal to a matched signal that compensates for an equivalent shock input to the VCM plant means. The equalizer means outputs the matched signal to the noise cancellation input.

In other features, the shock sensor means comprises a rotational shock sensor. Equalizing is based on a least means square analysis of at least one of the shock sensor signal and the position error signal. The equalizer means comprises filter means for generating a finite impulse response. A hard disk drive (HDD) comprises the control system. The equalizer means is calibrated during manufacturing by subjecting a section of the HDD to controlled shock events.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
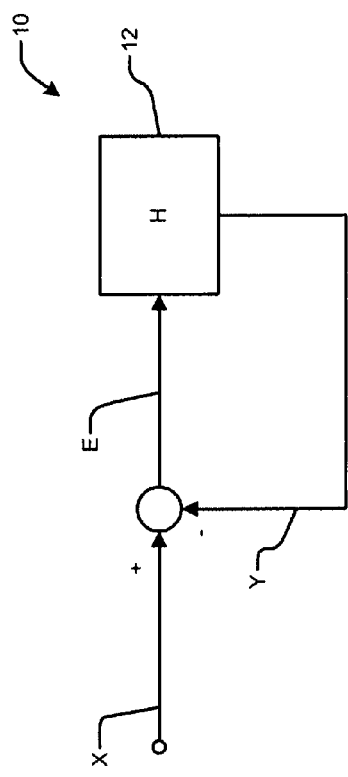
FIG. 1 is a functional block diagram of a control system according to the prior art.
Figure 2:
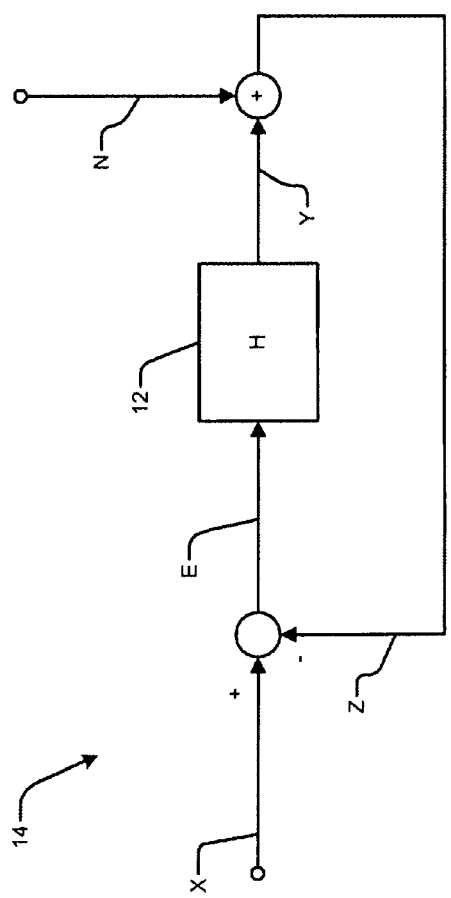
FIG. 2 is a functional block diagram of a control system that includes a noise component according to the prior art.
Figure 3:
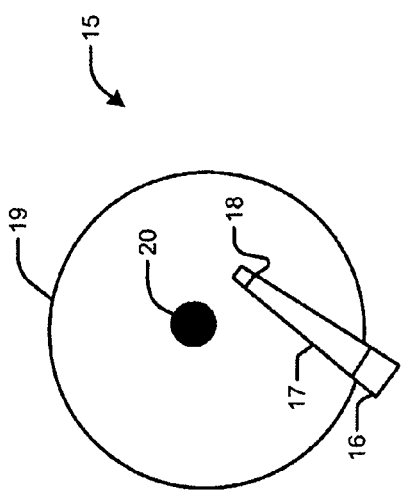
FIG. 3 is a functional block diagram of a hard disk assembly (HDD) according to the prior art.
Figure 4:
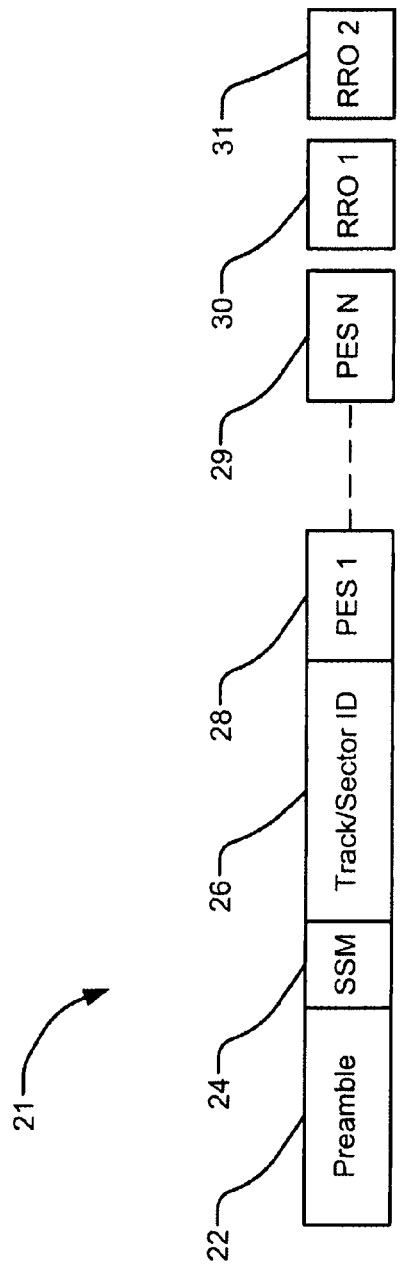
FIG. 4 is a functional block diagram of a servo wedge according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure describes a position control system for a hard disk drive (HDD) that may selectively respond to external shock. A shock sensor output may be equalized using, for example, an adaptive equalizer module. The control system may receive the equalized signal to cancel out or minimize position error signal (PES) variations due to shock/vibration events.

Figure 5:
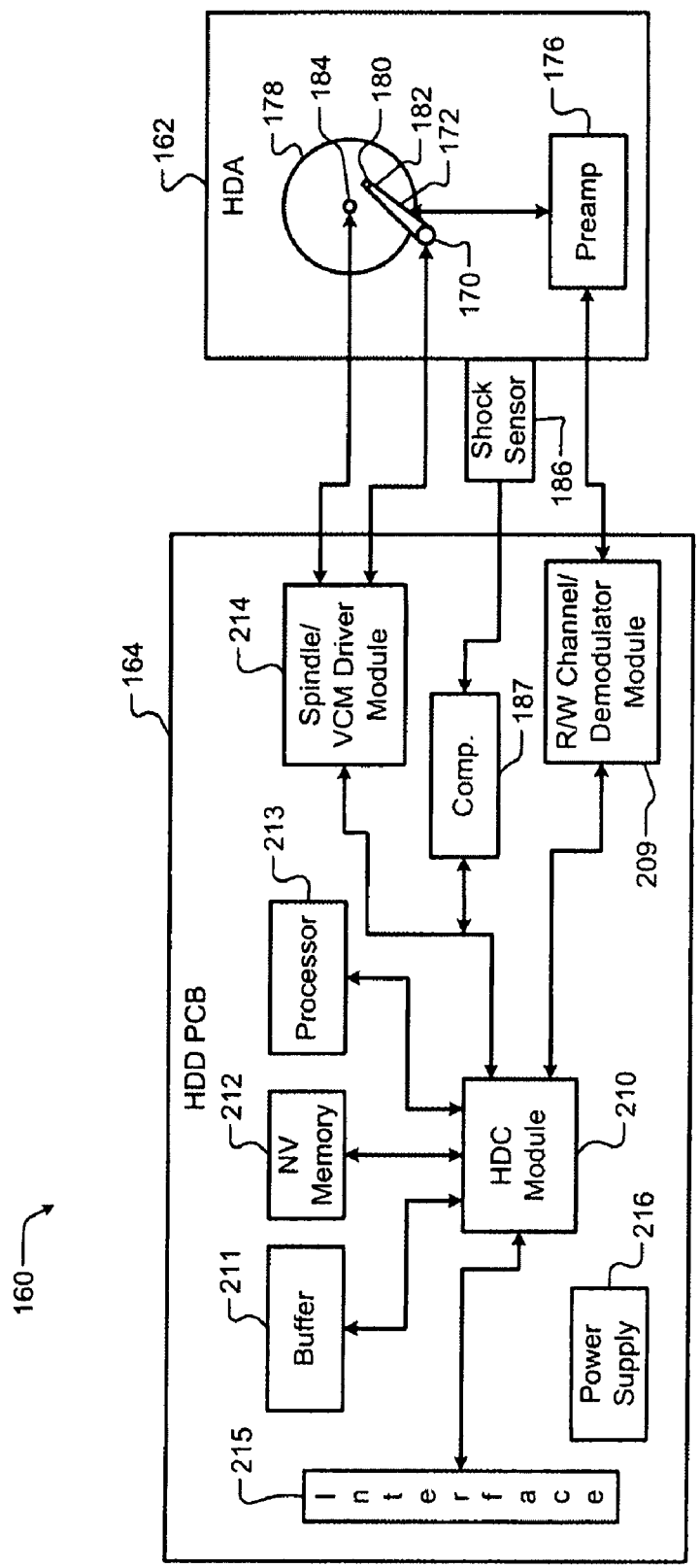
FIG. 5 is a functional block diagram of a hard disk drive (HDD) according to the present disclosure.

Referring now to FIG. 5, a hard disk drive (HDD) 160, which may be an exemplary rotating storage system, is illustrated. Sections of the HDD 160 include a hard disk assembly (HDA) 162 and a HDD printed circuit board (PCB) 164. The HDA 162 may include a voice-coil motor (VCM) 170 and head gimble assembly (HGA) 172 and a preamplifier device 176. The VCM/HGA 170, 172 may include a magnetic medium 178, such as one or more platters that store data, and a read/write device 180. The read/write device 180 may be arranged on an actuator arm 182 and may read and write data on the magnetic medium 178. Additionally, the VCM/HGA 170, 172 may include a spindle motor 184 that rotates the magnetic medium 178 and the VCM 170 that actuates the actuator arm 182.

A shock sensor 186 may communicate with the HDA 162 and/or the HDD PCB 164 and may generate shock sensor signals. An equalizer or adaptive noise equalizer module 187 may be used to equalize shock sensor signals so that the signals may cancel noise or shock signals in the HDD 160. The preamplifier device 176 amplifies signals generated by the read/write device 180 during read operations and provides signals to the read/write device 180 during write operations.

The HDD PCB 164 may include a read/write channel and demodulator module 209, a hard disk controller (HDC) module 210, a buffer 211, nonvolatile memory 212, a processor 213, and a spindle/VCM driver module 214. The spindle/VCM driver module 214 may be a control module that controls the spindle motor 184 and the VCM 170.

Shock signals may affect various subsystems of the HDD 160. For example, the spindle/VCM driver module 214 relies on data that is susceptible to shock events. The spindle/VCM driver module 214 controls a speed of the spindle motor 184 and thereby controls the rotational speed of the magnetic medium 178. The spindle/VCM driver module 214 uses timing and location (based on platter rotation) of back electromotive force (BEMF) to provide feedback measurements to the HDC control system 210.

The spindle/VCM driver module 214 also controls the position of a read/write device 180 on the actuator arm 182 via a servo. More specifically, the spindle/VCM driver module 214 controls a head suspension assembly to position the read/write device 180 as close as possible to a specified track location on the magnetic medium 178. Rotational shock may rotate the HDD 160 while inertia of the VCM/HGA 170, 172 may maintain some or all of the VCM/HGA 170, 172 in a predetermined angular position and/or on a predetermined angular path. Thus, shock may effectively rotate the VCM/HGA 170, 172 relative to the HDD 160 and thus cause a disturbance that may affect read/write device positioning.

Figure 6A:
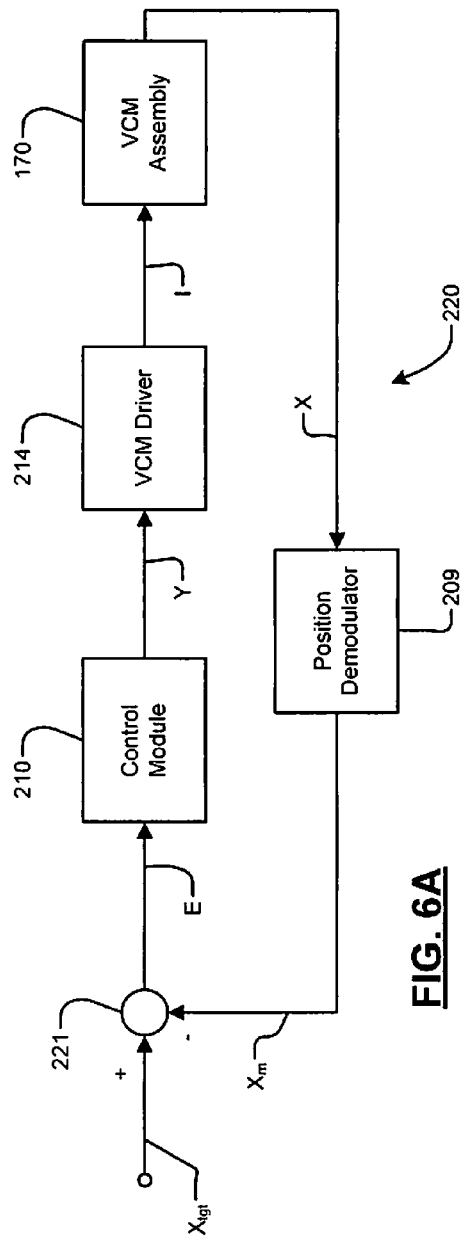
FIGS. 6A-6B are functional block diagrams of control systems according to the present disclosure.

Referring now to FIG. 6A, a block diagram of a control system 220, which may be a positioning system for a VCM control system (i.e. VCM control loop), is illustrated. The read/write device 180 may read back a pre-written servo pattern on the magnetic medium 178, and the servo position demodulator module (read/write channel/demodulator module 209) may convert the read back signal X into position information $X_m$. A difference generating module 221 may generate a difference signal by comparing the position information against a desired position value $X_{tgt}$. The difference signal, which may be an error signal E, may be fed into a control module 210, which may be a control filter. The control module 210 may be represented by a transfer function C. The output Y of the control module 210 may drive the VCM coil of the VCM assembly 170 through a VCM driver module 214 that provides a drive signal I. The VCM driver module 214 in turn may change position of the read/write device 180. The control system 220 may include negative feedback to minimize E.

Figure 6B:
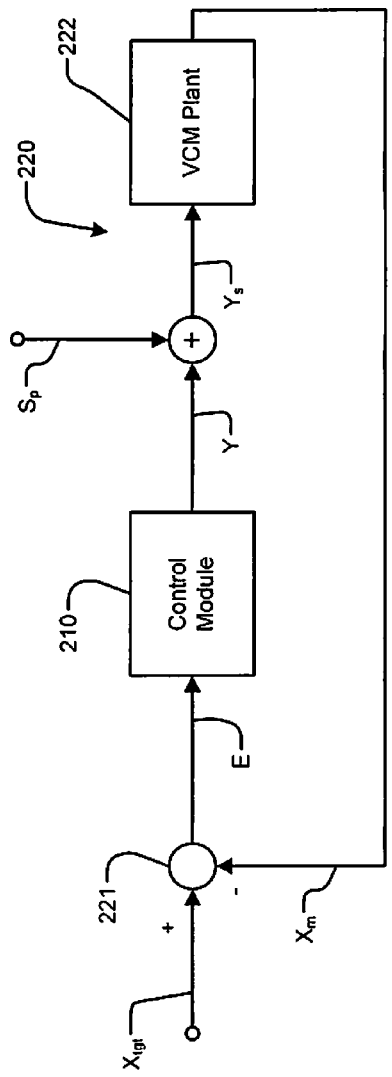

Referring now to FIG. 6B, the positioning control system may be simplified by combining the transfer functions of the VCM driver module 214, VCM assembly 170, and read/write channel/demodulator module 209. A resultant combined VCM plant module 222 may be represented by a transfer function P. For the purpose of modeling, a disturbance may be added to the control system 220 by injecting a driving force Sp into the VCM plant module 222. Namely, Sp may be added to the output Y of the control module 210 to form signal $Y_s$. The control system 220 may counter the disturbance to minimize E.

Figure 7:
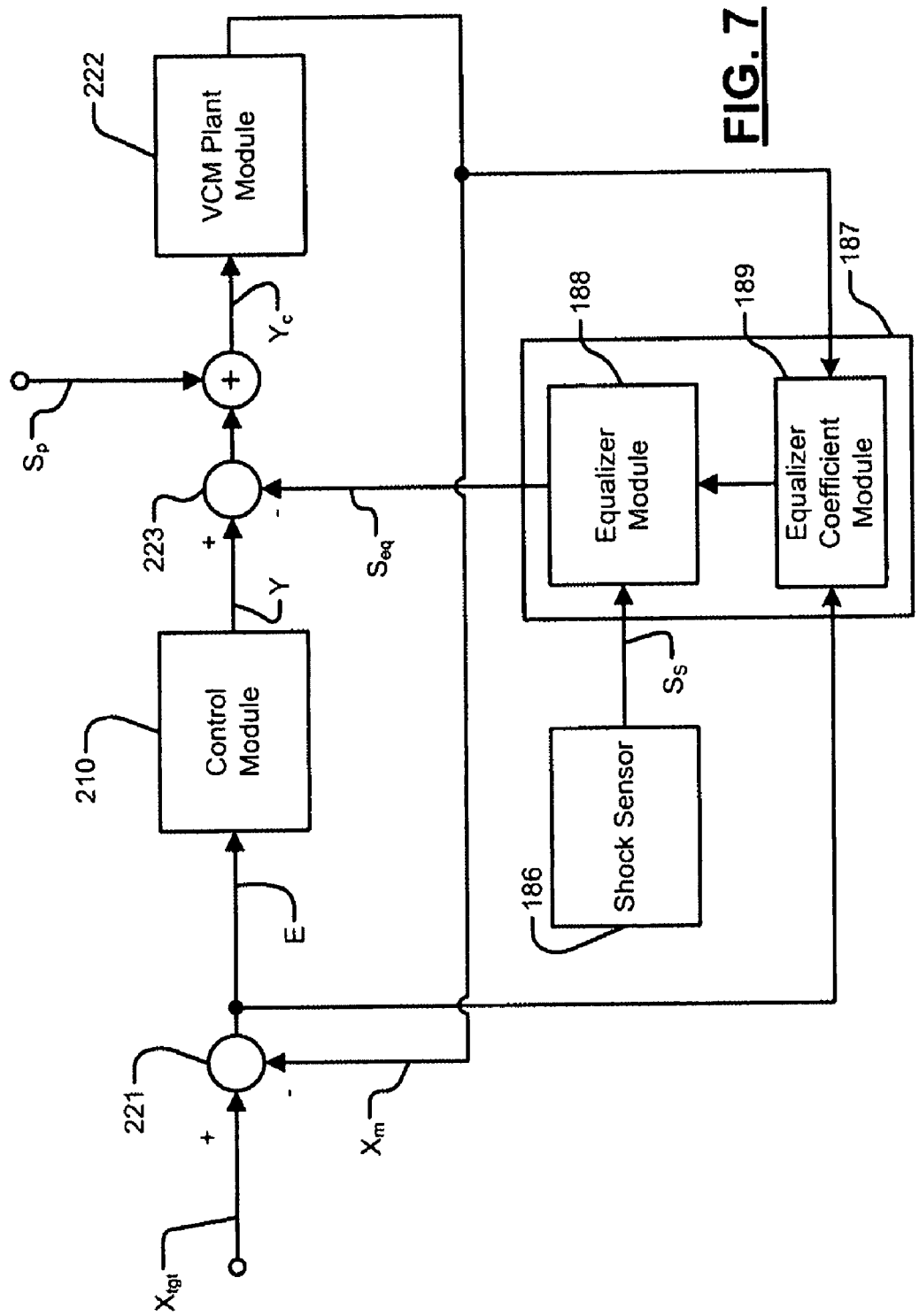
FIG. 7 is a functional block diagram of a control system that compensates for shock according to the present disclosure.

Referring now to FIG. 7, the shock sensor 186 may be an external high bandwidth rotational shock sensor or lateral shock sensor that senses shock events of the control system 220 in X/Y directions. A noise/shock vector $S_p$ determined from observables, such as E, relative to the external shock event may differ from the response of the shock sensor output $S_S$ relative to the shock event.

An equalizer module 188 within the noise equalizer module 187 may equalize the signal $S_S$ into a signal $S_{eq}$ that substantially equals the $S_p$ signal. An equalizer coefficient module 189 may be included within the control module 210 or the noise equalizer module 187. The equalizer coefficient module 189 may generate coefficients or settings for the equalizer module 188. The $S_{eq}$ may be matched to $S_p$ and feed-forward injected into the control module output Y to cancel $S_p$. A compensation module 223, which may be a summing module, may be used to injection $S_{eq}$. The compensation module 223 may also be considered a noise cancellation input point. The VCM plant module 222 may receive a corrected control signal $Y_c$. $Y_c$ may closely match Y and may be determined according to:

$$Y_c = E*C + S_p - S_{eq}$$

In other words, the equalized shock sensor output $S_{eq}$ may be feed forward injected to counter the effect of shock to the control system.

$S_p$ may be determined from E through the following:

$$X_{tgt} - X_m = E.$$

$X_{tgt}$ may be fixed to a constant value and essentially ignored leading to:

$$E = -X_m = -(E*C + S_p)*P$$

or $$E*(1+C*P) = -S_p*P.$$

Therefore, $S_p$ may be determined according to:

$$S_p = -E*(1+C*P)/P.$$

Further, built-in repeatable run-out (RRO) may be cancelled from E using similar methods as those discussed above so that the vector E is not colored by run-out values. Also, the VCM plant module 222 may be determined using, for example, a Bode plot technique.

The equalizer module transfer function (H) may be represented as:

$$H = S_p/S_S.$$

$S_p$ and $S_S$ may not be perfectly matched, and either or both may contain other noise from undetermined or unknown sources. Therefore, H may be determined when $H*S_S - S_p$ is minimized through, for example, a least mean square (LMS) fit. If the equalizer module 188 includes a finite impulse response filter (FIR) with coefficients $f_0, f_1, \ldots,$ and $f_n$, an equalizer module coefficient $f_k$ may also be adaptively determined through a LMS gradient process.

Using an FIR equalizer module, $$S_{eq}(n) = S_S(n)*f_0 + S_S(n-1)*f_1 + S_S(n-2)*f_2 + \ldots + S_S(n-m)*f_m.$$

The LMS adaptation process for the coefficient $f_k$ is may be determined through:

$$f_k(n+1) = f_k(n) + \mu * S_S(n-k) * (S_p(n) - S_{eq}(n)), \text{ for } k=1 \text{ to } m.$$

The equalizer module may include an Infinite Impulse Response (IIR) filter instead of or in addition to an FIR filter to lower FIR latency. Topology of the IIR filter may be based on the transfer function H.

In an alternative embodiment, the equalizer module coefficient $f_k$ may also be determined during a manufacturing process. For example, the HDA 162 may be mounted on a vibration platform that provides controlled vibration to cover a wide range of frequency content. In other words, the HDD 160 may be subjected to controlled shock events with known characteristics of wide frequency spectrum. In this way, equalizer module settings may be fixed for HDD operations, and $S_{eq}$ may be generated based on previous analysis.

In an alternative embodiment, the shock event may be modeled as a noise input to or within the control module 210. Further, a shock event input, such as $S_p$, and noise cancellation inputs, such as $S_{eq}$, may be modeled/injected at the same point in the control system 220.

Referring again to FIG. 5, the read channel/demodulator module 209 processes data received from and transmitted to the preamplifier device 176. The HDC module 210 controls components of the HDA 162 and communicates with an external device (not shown) via an I/O interface 215. The external device may include a computer, a multimedia device, a mobile computing device, etc. The I/O interface 215 may include wireline and/or wireless communication links.

The HDC module 210 may receive data from the HDA 162, the read channel/demodulator module 209, the buffer 211, nonvolatile memory 212, the processor 213, the spindle/VCM driver module 214, and/or the I/O interface 215. The processor 213 may process the data, including encoding, decoding, filtering, and/or formatting. The processed data may be output to the HDA 162, the read channel/demodulator module 209, the buffer 211, nonvolatile memory 212, the processor 213, the spindle/VCM driver module 214, and/or the I/O interface 215.

The HDC module 210 may use the buffer 211 and/or nonvolatile memory 212 to store data related to the control and operation of the HDD 160. The buffer 211 may include DRAM, SDRAM, etc. The nonvolatile memory 212 may include flash memory (including NAND and NOR flash memory), phase change memory, magnetic RAM, or multi-state memory, in which each memory cell has more than two states. The HDD PCB 164 includes a power supply 216 that provides power to the components of the HDD 160.

Figure 8:
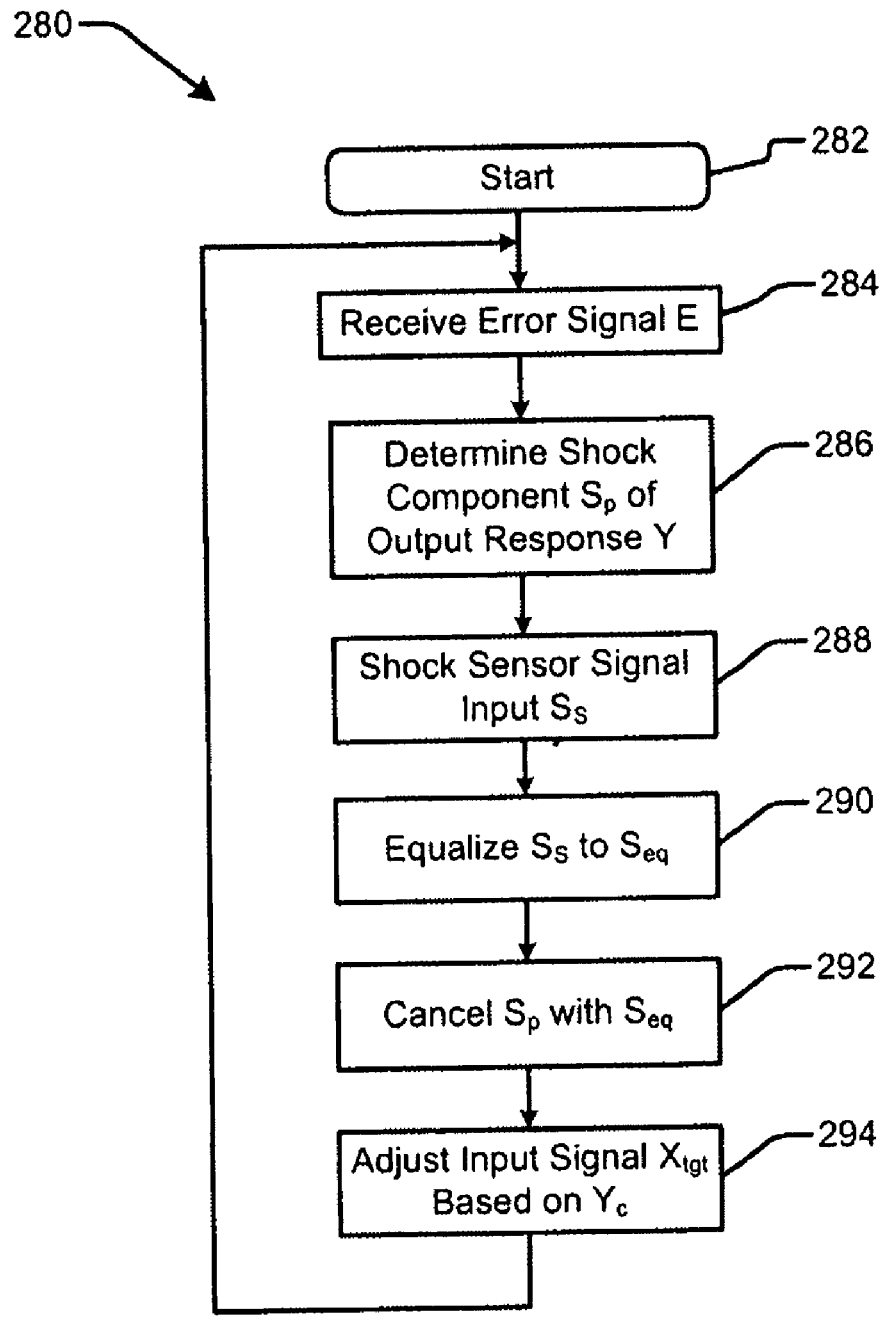
FIG. 8 is a flow diagram that illustrates steps of a shock compensation method according to the present disclosure.

Referring now to FIG. 8, a shock compensation/cancellation method 280 begins in step 282. In step 284, the control module receives an error signal E. In step 286, the control module determines a shock component $S_p$ of a non-observable output response signal Y based on the error signal E. For example, the control module processes E with a plant model H of the VCM plant module 222 to estimate the shock component $S_p$. Alternatively, the control module filters E to determine a shock component and processes the shock component $S_p$ with the plant model.

In step 288, a shock sensor that senses external shock to the HDD generates a signal $S_S$. In step 290, an equalizer module equalizes $S_S$ to a signal $S_{eq}$ that maximally matches the equivalent shock input to the VCM plant module. In step 292, the equalizer module injects the negative of the matched signal into, for example, a noise cancellation input point to counter the effect of external shock on the VCM/HGA. In step 294, the input signal $X_{tgt}$ is adjusted or updated based on $Y_c$. The adaptive control system may minimize matching of the PES signal against shock sensor input and may thus improve servo performance of the HDD against external shock events.

Figure 9A:
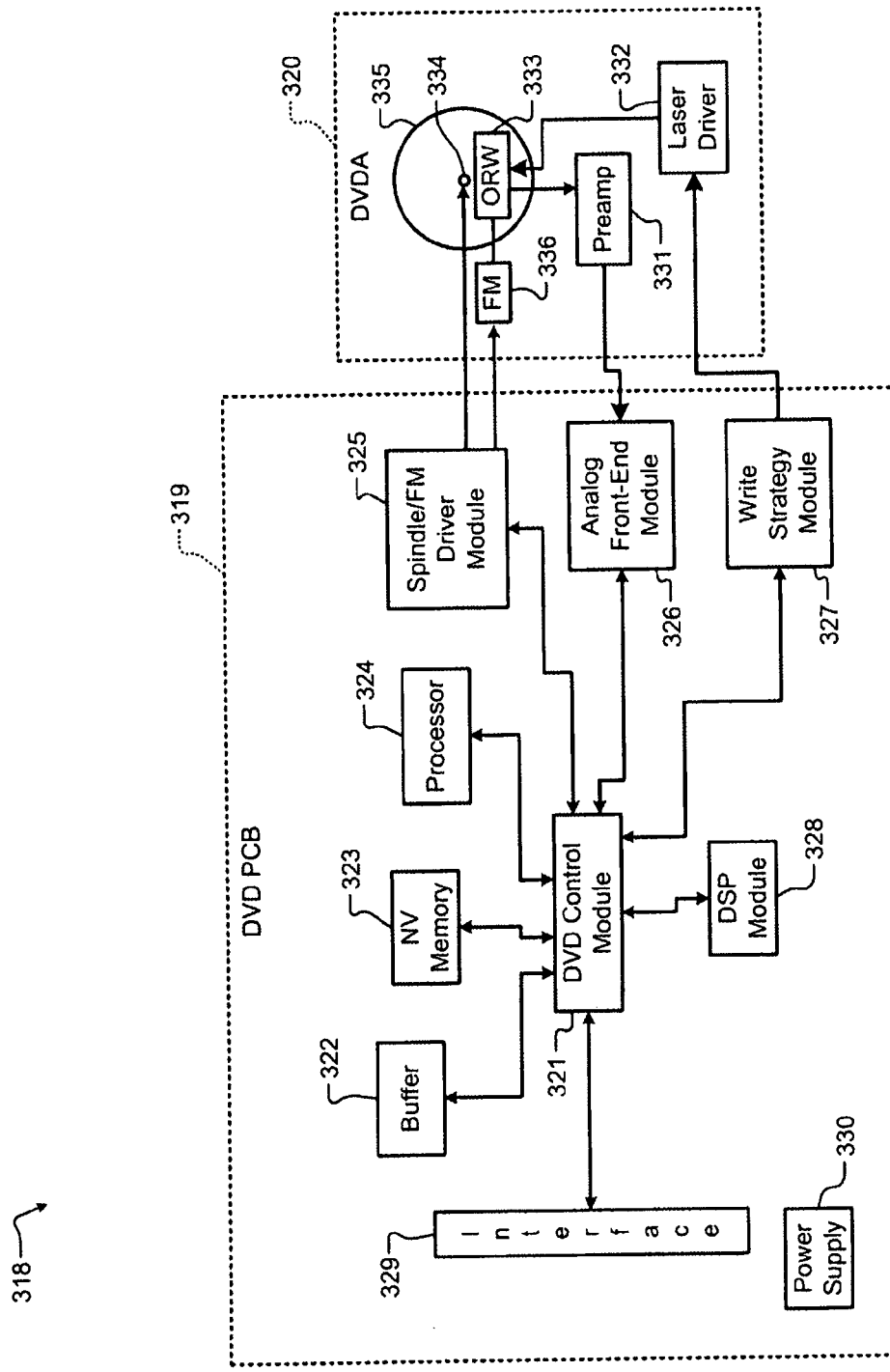
FIG. 9A is a functional block diagram of a DVD drive.

Referring now to FIGS. 9A-9F, various exemplary implementations incorporating the teachings of the present disclosure are shown. Referring now to FIG. 9A, the teachings of the disclosure can be implemented in a control system of a rotating storage device to compensate for external rotational shock. The preceding discussion illustrated a rotating storage device for magnetic data storage. Examples of rotating storage devices for optical data storage include a digital versatile disk (DVD) drive 318 shown in FIG. 9A and a compact disk (CD) drive (not shown). The CD drive has a similar architecture. The DVD drive 318 includes a DVD PCB 319 and a DVD assembly (DVDA) 320. The DVD PCB 319 includes a DVD control module 321, a buffer 322, nonvolatile memory 323, a processor 324, a spindle/FM (feed motor) driver module 325, an analog front-end module 326, a write strategy module 327, and a DSP module 328.

The DVD control module 321 controls components of the DVDA 320 and communicates with an external device (not shown) via an I/O interface 329. The external device may include a computer, a multimedia device, a mobile computing device, etc. The I/O interface 329 may include wireline and/or wireless communication links.

The DVD control module 321 may receive data from the buffer 322, nonvolatile memory 323, the processor 324, the spindle/FM driver module 325, the analog front-end module 326, the write strategy module 327, the DSP module 328, and/or the I/O interface 329. The processor 324 may process the data, including encoding, decoding, filtering, and/or formatting. The DSP module 328 performs signal processing, such as video and/or audio coding/decoding. The processed data may be output to the buffer 322, nonvolatile memory 323, the processor 324, the spindle/FM driver module 325, the analog front-end module 326, the write strategy module 327, the DSP module 328, and/or the I/O interface 329.

The DVD control module 321 may use the buffer 322 and/or nonvolatile memory 323 to store data related to the control and operation of the DVD drive 318. The buffer 322 may include DRAM, SDRAM, etc. The nonvolatile memory 323 may include flash memory (including NAND and NOR flash memory), phase change memory, magnetic RAM, or multi-state memory, in which each memory cell has more than two states. The DVD PCB 319 includes a power supply 330 that provides power to the components of the DVD drive 318.

The DVDA 320 may include a preamplifier device 331, a laser driver 332, and an optical device 333, which may be an optical read/write (ORW) device or an optical read-only (OR) device. A spindle motor 334 rotates an optical storage medium 335, and a feed motor 336 actuates the optical device 333 relative to the optical storage medium 335.

When reading data from the optical storage medium 335, the laser driver provides a read power to the optical device 333. The optical device 333 detects data from the optical storage medium 335, and transmits the data to the preamplifier device 331. The analog front-end module 326 receives data from the preamplifier device 331 and performs such functions as filtering and A/D conversion. To write to the optical storage medium 335, the write strategy module 327 transmits power level and timing data to the laser driver 332. The laser driver 332 controls the optical device 333 to write data to the optical storage medium 335.

Figure 9C:
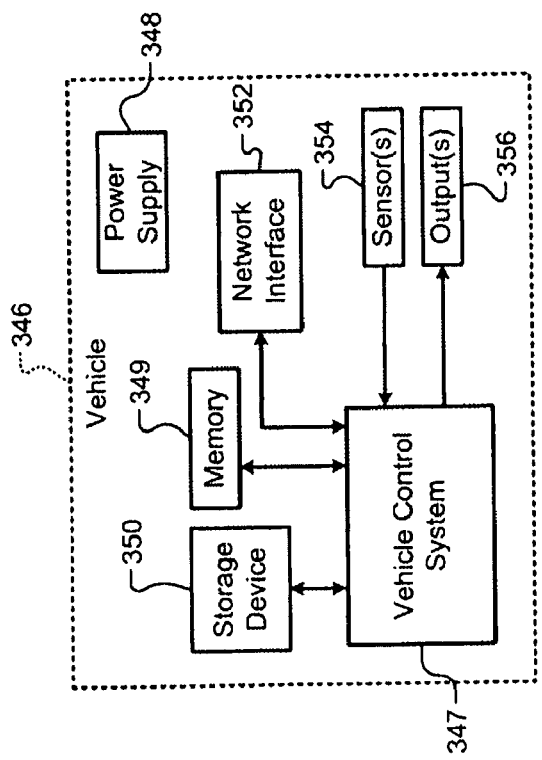
FIG. 9C is a functional block diagram of a vehicle control system.
Figure 9B:
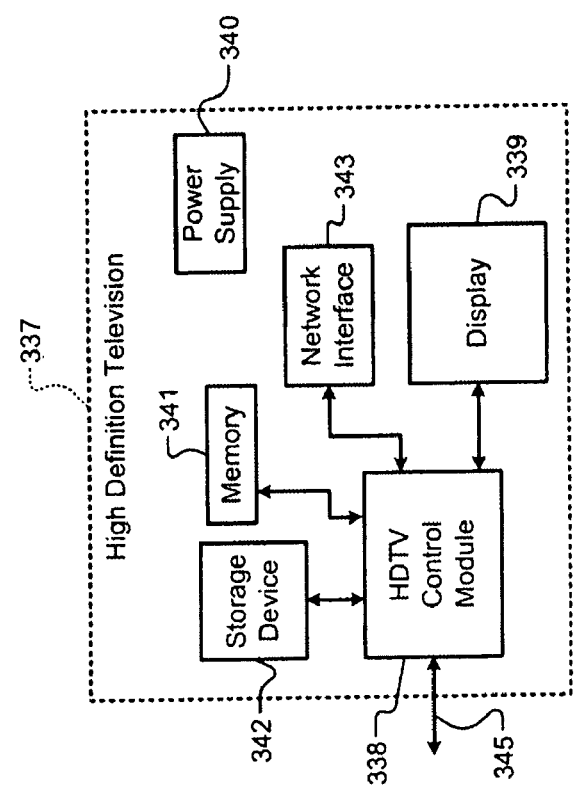
FIG. 9B is a functional block diagram of a high definition television.

Referring now to FIG. 9B, the teachings of the disclosure can be implemented as a control system in a rotating storage device of a high definition television (HDTV) 337. The HDTV 337 includes a HDTV control module 338, a display 339, a power supply 340, memory 341, the storage device 342, a network interface 343, and an external interface 345. If the network interface 343 includes a wireless local area network interface, an antenna (not shown) may be included.

The HDTV 337 can receive input signals from the network interface 343 and/or the external interface 345, which can send and receive data via cable, broadband Internet, and/or satellite. The HDTV control module 338 may process the input signals, including encoding, decoding, filtering, and/or formatting, and generate output signals. The output signals may be communicated to one or more of the display 339, memory 341, the rotating storage device 342, the network interface 343, and the external interface 345.

Memory 341 may include random access memory (RAM) and/or nonvolatile memory such as flash memory, phase change memory, or multi-state memory, in which each memory cell has more than two states. The storage device 342 may include an optical storage drive, such as a DVD drive, and/or a HDD. The HDTV control module 338 communicates externally via the network interface 343 and/or the external interface 345. The power supply 340 provides power to the components of the HDTV 337.

Referring now to FIG. 9C, the teachings of the disclosure may be implemented as a control system of a rotating storage device of a vehicle 346. The vehicle 346 may include a vehicle control system 347, a power supply 348, memory 349, the rotating storage device 350, and a network interface 352. If the network interface 352 includes a wireless local area network interface, an antenna (not shown) may be included.

The vehicle control system 347 may be a powertrain control system, a body control system, an entertainment control system, an anti-lock braking system (ABS), a navigation system, a telematics system, a lane departure system, an adaptive cruise control system, etc.

The vehicle control system 347 may communicate with one or more sensors 354 and generate one or more output signals 356. The sensors 354 may include temperature sensors, acceleration sensors, pressure sensors, rotational sensors, airflow sensors, etc. The output signals 356 may control engine operating parameters, transmission operating parameters, suspension parameters, etc.

The power supply 348 provides power to the components of the vehicle 346. The vehicle control system 347 may store data in memory 349 and/or the rotating storage device 350. Memory 349 may include random access memory (RAM) and/or nonvolatile memory such as flash memory, phase change memory, or multi-state memory, in which each memory cell has more than two states. The rotating storage device 350 may include an optical storage drive, such as a DVD drive, and/or HDD. The vehicle control system 347 may communicate externally using the network interface 352.

Figure 9E:
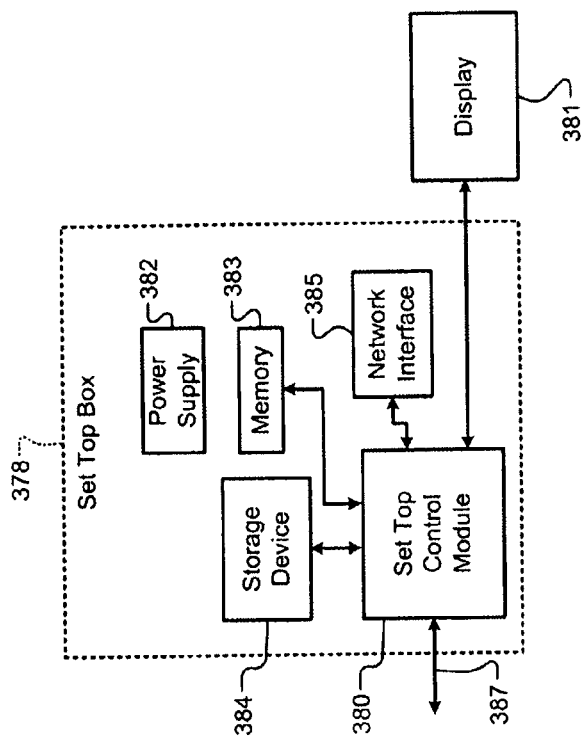
FIG. 9E is a functional block diagram of a set top box.
Figure 9D:
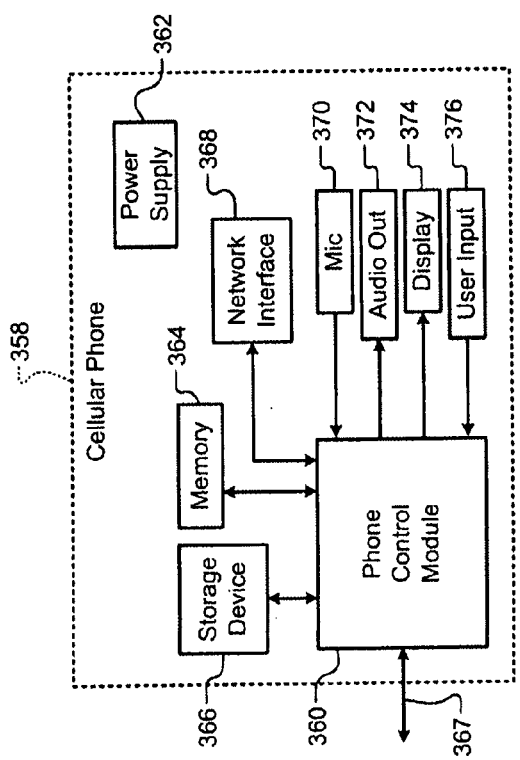
FIG. 9D is a functional block diagram of a cellular phone.

Referring now to FIG. 9D, the teachings of the disclosure can be implemented as a control system of a rotating storage device of a cellular phone 358. The cellular phone 358 includes a phone control module 360, a power supply 362, memory 364, the rotating storage device 366, and a cellular network interface 367. The cellular phone 358 may include a network interface 368, a microphone 370, an audio output 372 such as a speaker and/or output jack, a display 374, and a user input device 376 such as a keypad and/or pointing device. If the network interface 368 includes a wireless local area network interface, an antenna (not shown) may be included.

The phone control module 360 may receive input signals from the cellular network interface 367, the network interface 368, the microphone 370, and/or the user input device 376. The phone control module 360 may process signals, including encoding, decoding, filtering, and/or formatting, and generate output signals. The output signals may be communicated to one or more of memory 364, the storage device 366, the cellular network interface 367, the network interface 368, and the audio output 372.

Memory 364 may include random access memory (RAM) and/or nonvolatile memory such as flash memory, phase change memory, or multi-state memory, in which each memory cell has more than two states. The rotating storage device 366 may include an optical storage drive, such as a DVD drive, and/or a HDD. The power supply 362 provides power to the components of the cellular phone 358.

Referring now to FIG. 9E, the teachings of the disclosure can be implemented as a control system of a rotating storage device of a set top box 378. The set top box 378 includes a set top control module 380, a display 381, a power supply 382, memory 383, the rotating storage device 384, and a network interface 385. If the network interface 385 includes a wireless local area network interface, an antenna (not shown) may be included.

The set top control module 380 may receive input signals from the network interface 385 and an external interface 387, which can send and receive data via cable, broadband Internet, and/or satellite. The set top control module 380 may process signals, including encoding, decoding, filtering, and/or formatting, and generate output signals. The output signals may include audio and/or video signals in standard and/or high definition formats. The output signals may be communicated to the network interface 385 and/or to the display 381. The display 381 may include a television, a projector, and/or a monitor.

The power supply 382 provides power to the components of the set top box 378. Memory 383 may include random access memory (RAM) and/or nonvolatile memory such as flash memory, phase change memory, or multi-state memory, in which each memory cell has more than two states. The rotating storage device 384 may include an optical storage drive, such as a DVD drive, and/or a hard disk drive (HDD).

Figure 9F:
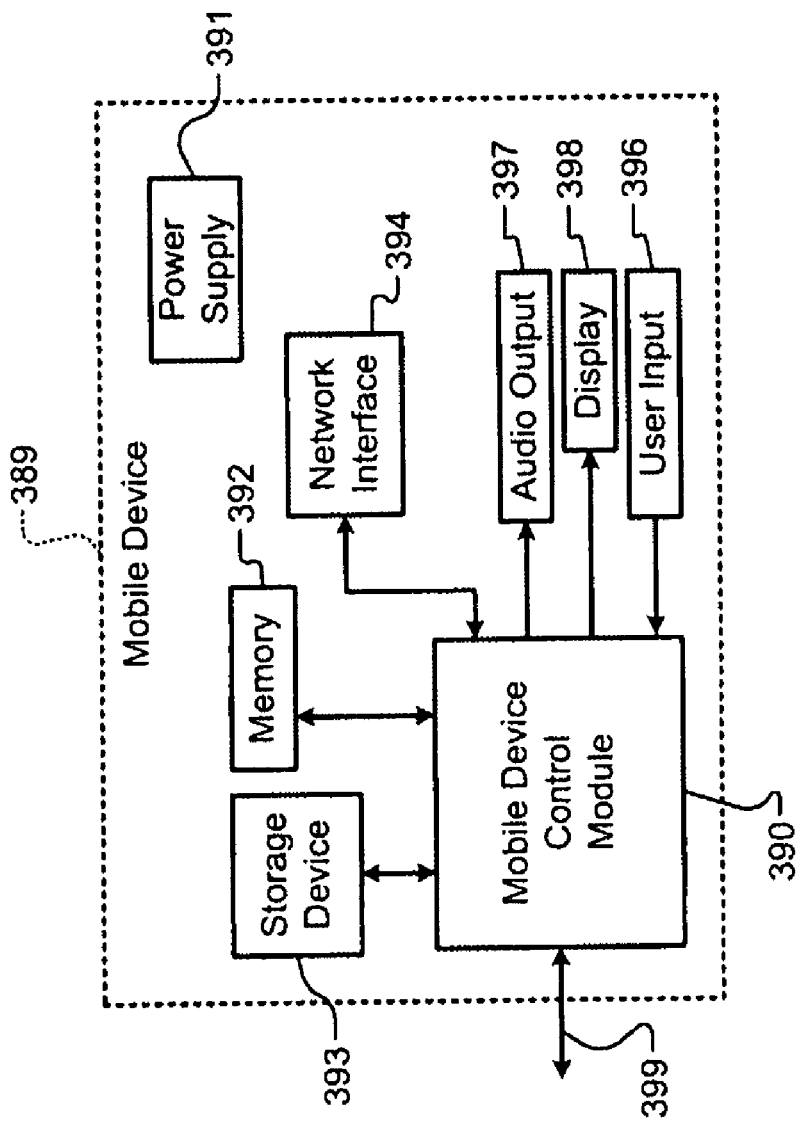
FIG. 9F is a functional block diagram of a mobile device.

Referring now to FIG. 9F, the teachings of the disclosure can be implemented as a control system in a rotating storage device of a mobile device 389. The mobile device 389 may include a mobile device control module 390, a power supply 391, memory 392, the rotating storage device 393, a network interface 394, and an external interface 399. If the network interface 394 includes a wireless local area network interface, an antenna (not shown) may be included.

The mobile device control module 390 may receive input signals from the network interface 394 and/or the external interface 399. The external interface 399 may include USB, infrared, and/or Ethernet. The input signals may include compressed audio and/or video, and may be compliant with the MP3 format. Additionally, the mobile device control module 390 may receive input from a user input 396 such as a keypad, touchpad, or individual buttons. The mobile device control module 390 may process input signals, including encoding, decoding, filtering, and/or formatting, and generate output signals.

The mobile device control module 390 may output audio signals to an audio output 397 and video signals to a display 398. The audio output 397 may include a speaker and/or an output jack. The display 398 may present a graphical user interface, which may include menus, icons, etc. The power supply 391 provides power to the components of the mobile device 389. Memory 392 may include random access memory (RAM) and/or nonvolatile memory such as flash memory, phase change memory, or multi-state memory, in which each memory cell has more than two states. The rotating storage device 393 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A control system comprising:
    a difference generating module for a rotating storage system, wherein the difference generating module generates a position error signal based on a target position signal and a current position signal;
    a control module for the rotating storage system, wherein the control module generates an output response based on the position error signal;
    a noise equalizer module for the rotating storage system, wherein the noise equalizer module generates a noise equalization signal that is based on a sensor signal and a coefficient, wherein the noise equalizer module comprises an equalizer coefficient module to generate the coefficient based on the current position signal and the position error signal; and a compensation module for the rotating storage system, wherein the compensation module adjusts the output response based on the noise equalization signal.

2. The control system of claim 1, wherein the compensation module comprises a summing module.

3. The control system of claim 1, further comprising a plant module that generates the current position signal.

4. The control system of claim 1, further comprising a shock sensor that senses shock experienced by the rotating storage system and that generates the sensor signal.

5. The control system of claim 4, wherein the shock sensor senses and lateral shock experienced by the rotating storage system.

6. The control system of claim 1, wherein the noise equalizer module comprises an equalizer module.

7. The control system of claim 6, wherein a transfer function of the equalizer module is determined using a least means square function of at least one of the sensor signal and the position error signal.

8. The control system of claim 6, wherein the equalizer module comprises one of a finite impulse response filter or an infinite impulse response filter.

9. The control system of claim 6, wherein the equalizer coefficient module generates the coefficient, and wherein the equalizer module uses the coefficient to generate the noise equalization signal.

10. The control system of claim 3, wherein the plant module comprises a transfer function of at least one of a voice coil motor (VCM) driver, a VCM assembly, and a position demodulator.

11. The control system of claim 1, wherein the control module compensates for repeatable run-out (RRO) in the position error signal.

12. A storage device comprising:
the control system of claim 1; and
one of an optical storage device or a magnetic storage device.

13. A hard disk drive (HDD) comprising:
the control system of claim 1; and
a spindle control module that implements the control system.

14. A HDD comprising:
the control system of claim 1; and
a voice coil motor (VCM) control module that implements the control system.

15. The control system of claim 1, wherein the equalizer module is calibrated during manufacturing by subjecting the rotating storage system to controlled shock events.

16. The control system of claim 1, wherein the rotating storage system is subjected to the controlled shock events on a vibration platform.

17. A control system for compensating for shock events in a voice coil motor (VCM) control system of a rotating storage device, the control system comprising:
a VCM control loop that includes a VCM plant module and a noise cancellation input;
a shock sensor that generates a shock signal; and
an equalizer module that equalizes the shock signal to a matched signal using the current position signal and the position error signal,
wherein the matched signal compensates for an equivalent shock input to the VCM plant module, and
wherein the equalizer module outputs the matched signal to the noise cancellation input.

18. The control system of claim 17, wherein the shock sensor comprises a rotational shock sensor.

19. The control system of claim 17, wherein the equalizer module equalizes based on a least means square analysis of at least one of the shock sensor signal and the position error signal.

20. The control system of claim 17, wherein the equalizer module comprises a finite impulse response filter.

21. A hard disk drive (HDD) comprising:
the control system of claim 17, wherein the equalizer module is calibrated during manufacturing by subjecting the HDD to controlled shock events.

22. A method for controlling a rotating storage system, the method comprising:
generating a position error signal based on a target position signal and a current position signal;
generating an output response based on the position error signal;
generating a noise equalization signal based on a sensor signal and a coefficient, wherein the coefficient is generated based on the current position signal and the position error signal; and
adjusting the output response based on the noise equalization signal.

23. The method of claim 22, further comprising generating the current position signal in a plant module.

24. The method of claim 22, further comprising:
sensing shock experienced by the rotating storage system; and
generating the sensor signal in response to the shock.

25. The method of claim 24, wherein sensing shock further comprises sensing at least one of rotational shock and lateral shock experienced by the rotating storage system.

26. The method of claim 22, further comprising generating a transfer function based on a least means square function of at least one of the sensor signal and the position error signal.

27. The method of claim 22, further comprising:
generating a coefficient; and
using the coefficient to generate the noise equalization signal.

28. The method of claim 22, further comprising compensating for repeatable run-out (RRO) in the position error signal.

29. The method of claim 22, further comprising calibrating an equalizer module that generates the noise equalization signal during manufacturing of the rotating storage system by applying shock to at least a section of the rotating storage system through controlled shock events.

30. The method of claim 29, further comprising subjecting the section to the controlled shock events on a vibration platform.

31. The method of claim 29, further comprising fixing settings for the equalizer module based on the calibration of the equalizer module.

32. A method for compensating for shock events in a voice coil motor (VCM) control system of a rotating storage device, the method comprising:
generating a shock signal;
equalizing the shock signal with a matched signal using the current position signal and the position error signal, wherein the matched signal compensates for an equivalent shock input to a VCM plant module of a VCM control loop; and
outputting the matched signal to a noise cancellation input of the VCM control loop.

33. The method of claim 32 wherein the shock signal comprises a rotational shock signal.

34. The method of claim 32, further comprising analyzing the shock signal based on a least means square function.

35. The method of claim 32, further comprising calibrating an equalizer module during manufacturing of the rotating storage device by applying shock to the rotating storage device through controlled shock events, wherein the equalizer module equalizes the shock signal.

36. A method for calibrating a voice coil motor (VCM) control loop of a hard disk drive (HDD), the method comprising:

applying controlled shock events to a hard disk assembly (HDA) of the HDD during a manufacturing process;

calibrating an equalizer module of the VCM control loop based on the controlled shock events, the equalizer module adapted to equalize a shock sensor signal using a current position signal and a position error signal, wherein the equalizer module compensates for an equivalent shock input to a VCM plant module of a VCM control loop; and fixing settings for the equalizer module based on the calibration of the equalizer module.

* * * * *